United States Patent
Andrus et al.

(10) Patent No.: US 8,336,950 B2
(45) Date of Patent: Dec. 25, 2012

(54) INFLATABLE TRAILER SKIRT

(76) Inventors: Paul Guy Andrus, Ancaster (CA); Gayle Campbell-Andrus, Ancaster (CA)

(*) Notice: Subject to any disclaimer, the term of this patent is extended or adjusted under 35 U.S.C. 154(b) by 0 days.

(21) Appl. No.: 13/326,307

(22) Filed: Dec. 14, 2011

(65) Prior Publication Data
US 2012/0080905 A1     Apr. 5, 2012

Related U.S. Application Data

(63) Continuation of application No. 12/381,425, filed on Mar. 13, 2009, now Pat. No. 8,087,715.

(51) Int. Cl.
  *B62D 37/02* (2006.01)
(52) U.S. Cl. .................. 296/180.1; 296/180.4
(58) Field of Classification Search ............ 296/180.1, 296/180.2, 180.3, 180.4, 180.5, 108.4
  See application file for complete search history.

(56) References Cited

U.S. PATENT DOCUMENTS

| | | | | |
|---|---|---|---|---|
| 4,611,847 A | * | 9/1986 | Sullivan | 296/180.2 |
| 6,742,616 B2 | * | 6/2004 | Leban | 296/180.4 |
| 7,748,772 B2 | * | 7/2010 | Boivin et al. | 296/180.4 |
| 8,087,715 B2 | * | 1/2012 | Andrus et al. | 296/180.1 |

* cited by examiner

*Primary Examiner* — Lori Lyjak
(74) *Attorney, Agent, or Firm* — Steven M. Greenberg, Esq.; Carey Rodriguez Greenberg & O'Keefe, LLP

(57) ABSTRACT

The invention comprises a set of tubular inflatable bags mounted to the underside of a transport trailer along its lower edge in front of the rear wheel assembly. The bags are pressurized by ram air inflation upon forward motion of the trailer, such that they prevent air from entering the rear wheel assembly and thereby reduce aerodynamic drag. The outer exposed sides of the bags are vertically and horizontally straightened and stiffened by horizontal ribs which are anchored by cords to the trailer. The apparatus gives way without stress when unpressurized at slow speed and when docking to avoid damage.

5 Claims, 5 Drawing Sheets

INFLATABLE TRAILER SKIRT

CROSS-REFERENCE TO RELATED APPLICATIONS

This application is a Continuation of U.S. application Ser. No. 12/381,425, filed Mar. 13, 2009, entitled "INFLATABLE TRAILER SKIRT," the entirety of which is incorporated herein by reference.

BACKGROUND OF THE INVENTION

It has been well established that trailer skirts reduce aerodynamic drag of a standard tractor trailer by 5-15% depending on their length. A drawback of a rigid panel as a skirt, is that it is prone to contact with rigid ground structures when driving at slow speed (i.e. curbs, railway tracks, snow banks, camber in the docking ramp . . . ), and can therefore be damaged. A primary object of the present invention is to provide a trailer skirt that is stiff and wind resistant when needed at highway speed, but supple and readily stowable at slow speed. An inflatable has its own inherent problems however in that without a stabilizing structure, it would be misshapen, and vibrate such that it too would have limited longevity. The present invention therefore employs a horizontal rib structure affixed the inflatable bag to solve the shape problem, and inelastic cords anchored to the trailer to solve the stability problem. Andrus U.S. Pat. No. 7,147,270 describes the use of horizontal ribs to shape control an inflatable boattail device, and Andrus U.S. Pat. No. 6,409,252 describes the use of inelastic cords to stabilize a boattail. The boattail bags retain symmetry along the trailer's longitudinal axis by inflating against one another, while the skirt bags of the present invention are free floating and require a specific crossed cord arrangement described herein in order to retain vertical orientation and optimize stability when pressurized. Further to Andrus U.S. Pat. No. 7,147,270 the present disclosure also describes a means of providing a universal joint at structural rib interruptions such that a crumple zone is created at the ends of the bags, while retaining a smooth unbuckled surface at these interruptions when the bags are pressurized. The object here is to allow the bags to yield with little stress when contacted end-on, laterally or from below.

DETAILED DESCRIPTION OF THE PREFERRED EMBODIMENT

Figure 1:
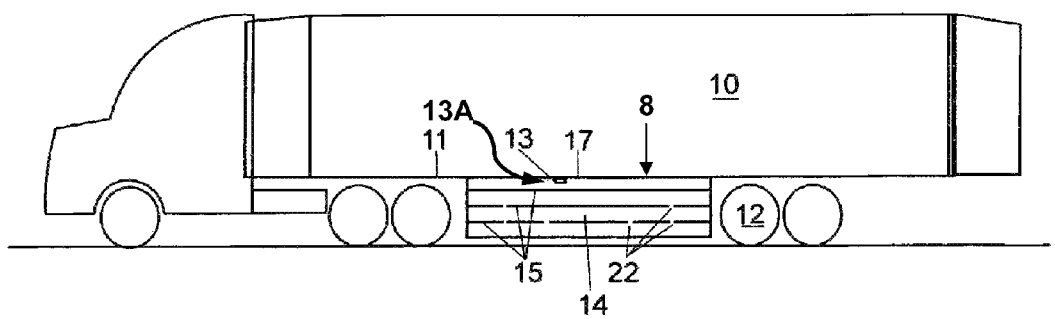
FIG. 1 is a side view of a tractor trailer with a single bag version of the trailer skirt mounted.
Figure 2:
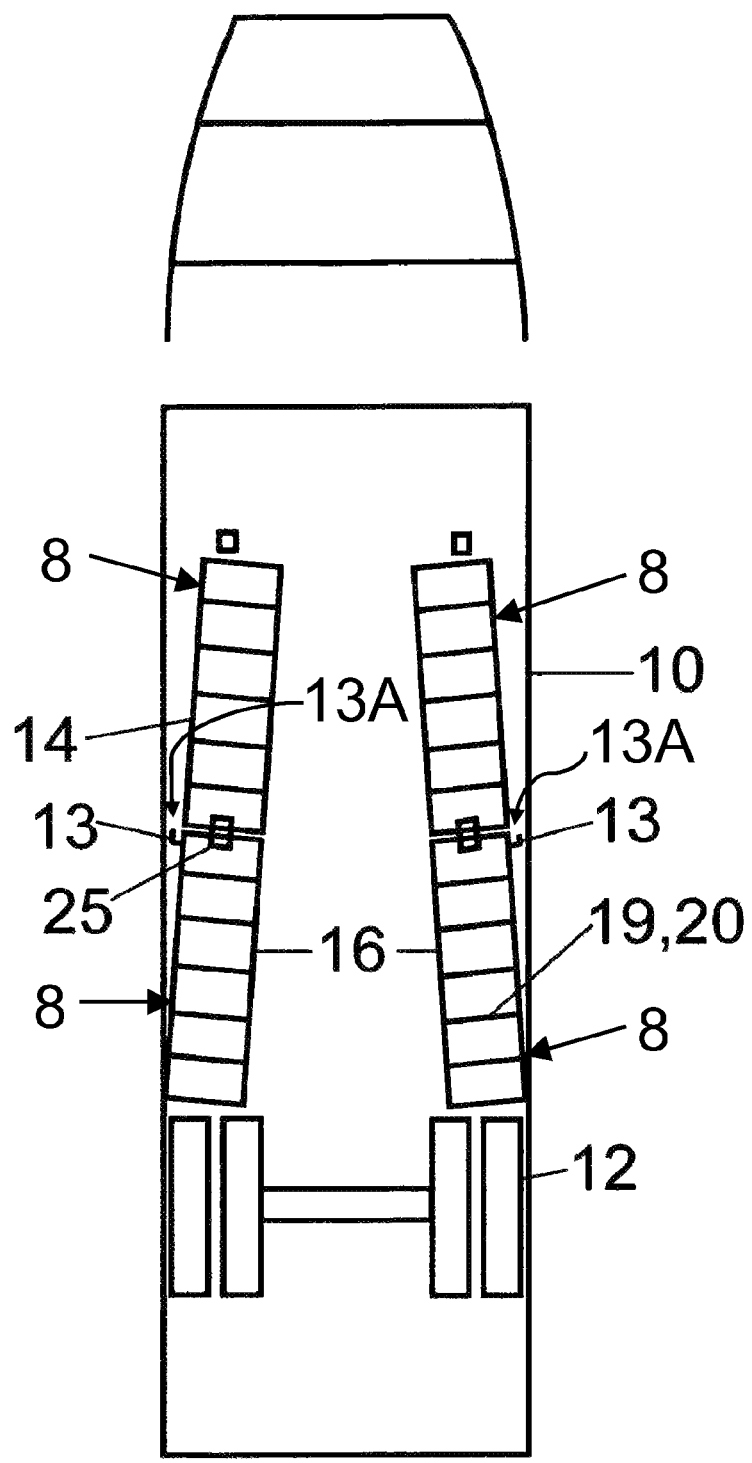
FIG. 2 is a top view of a double bag version of the trailer skirt in a slightly wedged configuration.
Figure 3:
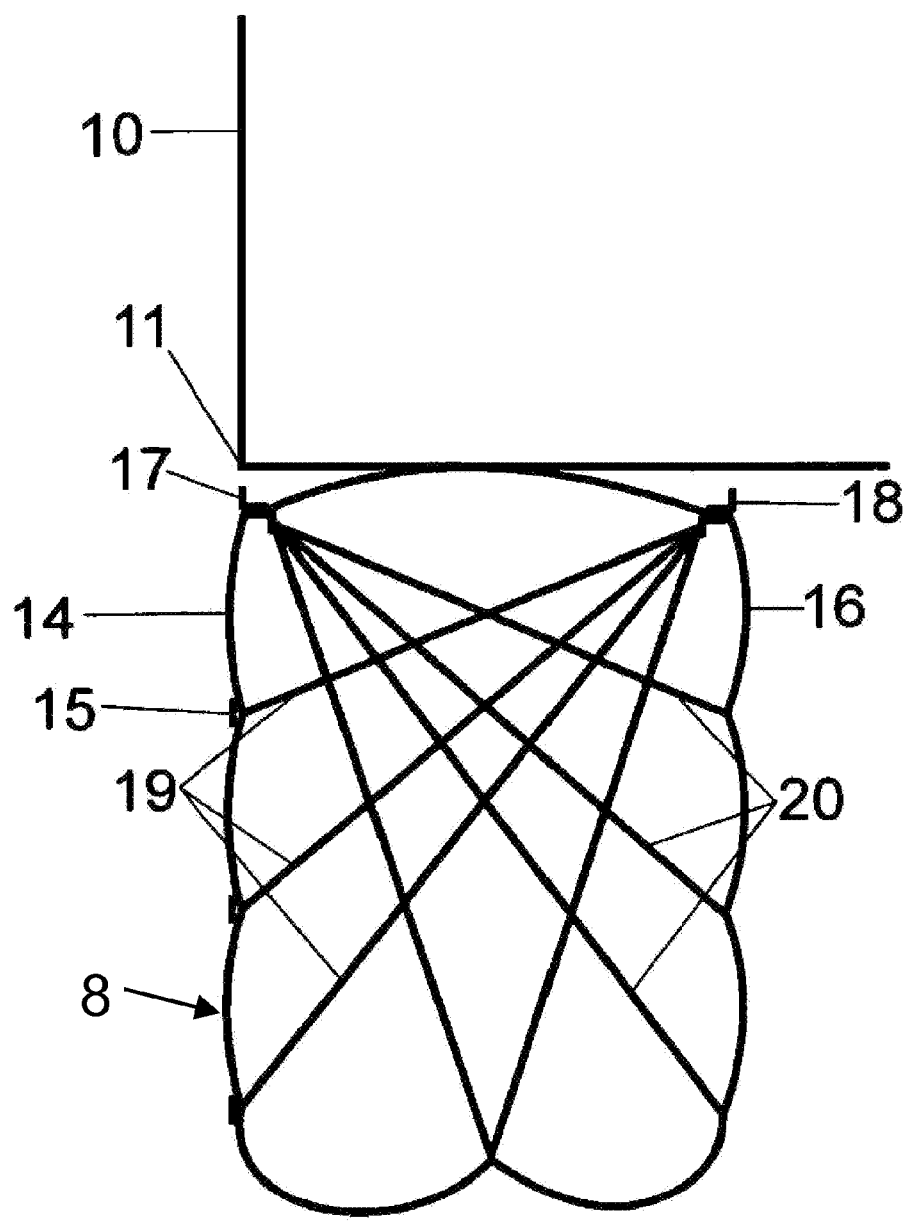
FIG. 3 is an end-on cross section through the bag showing an array of internal cords.
Figure 4:
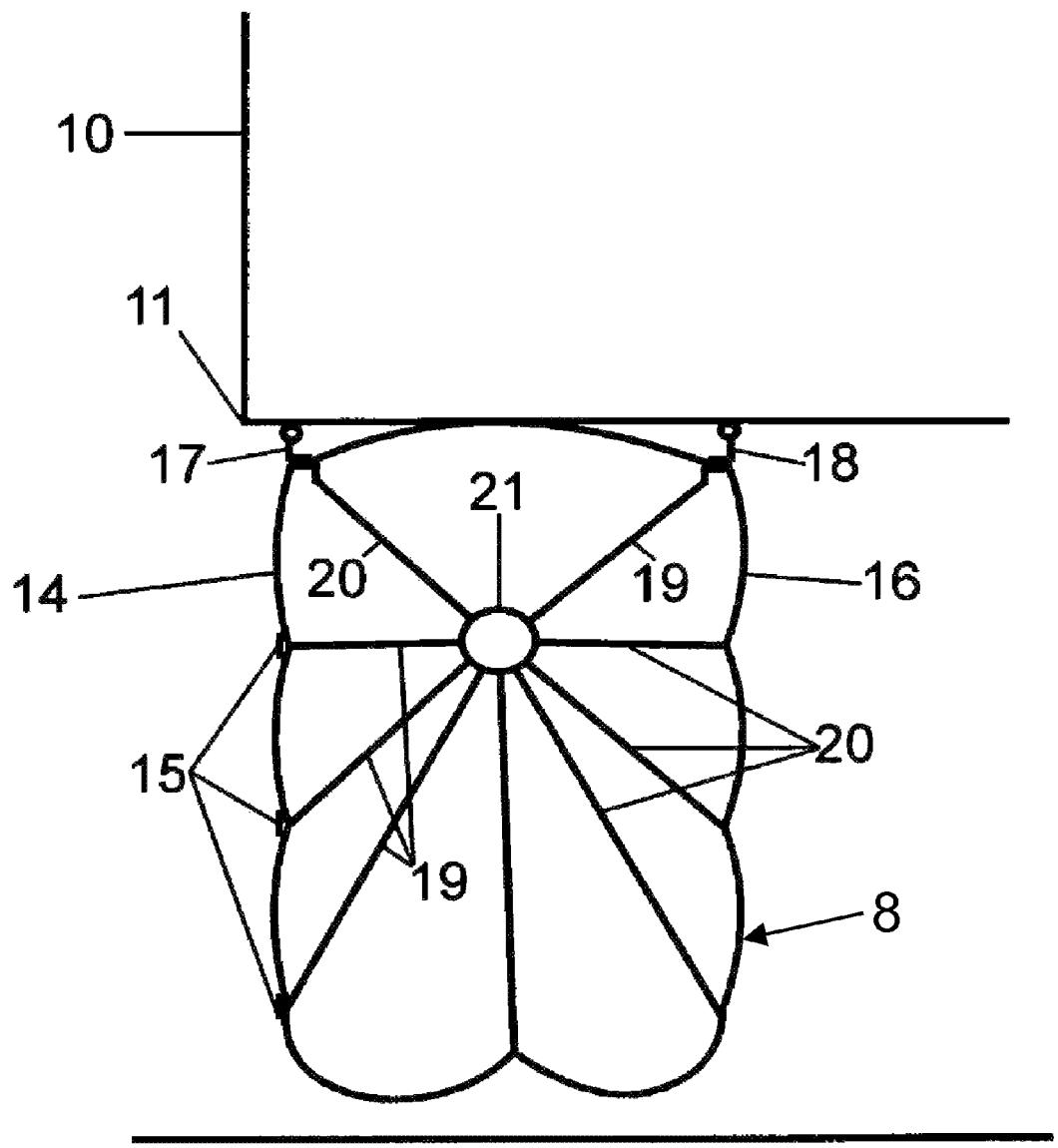
FIG. 4 is an end-on cross section through the bag showing another variation on the array of internal cords.
Figure 5:
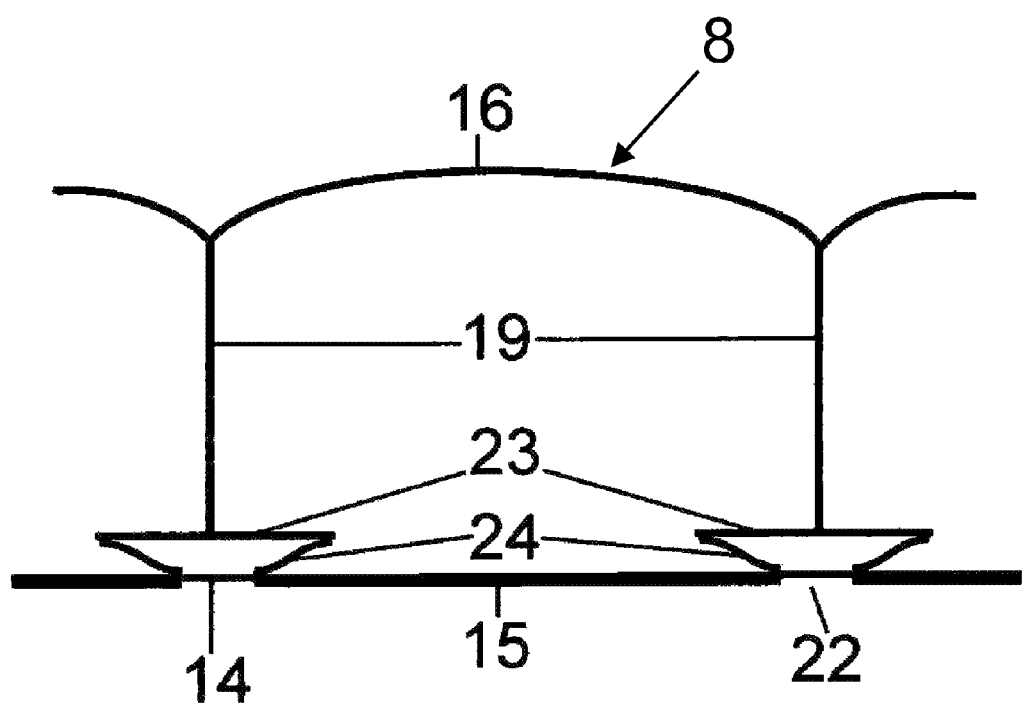
FIG. 5 is a longitudinal cross section viewed from the top showing the rib joint apparatus.

The invention comprises a set of inflatable tubes which, in the illustrated embodiments, take the form of tubular bags 8 mounted to the underside of a transport trailer 10 along or near its lower lateral edge 11. The device is located just forward of the rear wheels 12 so as to direct airflow away from the wheels and thus avoid their associated aerodynamic drag. The bags 8 are pressurized during forward motion of the trailer by ram air attacking a forward facing air scoop 13 which is mounted on the lateral side 14 of the bag 8 near the edge 11. The open end 13A of the air scoop 13 faces forwardly. The lateral surface 14 of the bag 8 is reinforced by horizontal ribs 15. The lateral surface 14 and medial surface 16 are reinforced at their upper edges by a lateral spine 17 and a medial spine 18, which attach directly to the trailer. A series of inelastic cords 19 join the medial spine 18 to the lateral surface 14 along the horizontal ribs 15. Another series of inelastic cords 20 join the lateral spine 17 to the medial surface 16. Various arrays of cords 19 and 20 are possible as shown in FIGS. 3 and 4. In a preferred version of FIG. 4 the cords are attached to and extend radially from a ring 21 in order to facilitate simple construction while maintaining two dimensional anchoring of the array into the spines 17 and 18. The ribs 15 have one or more interruptions 22 which are spanned on the inside of the bag 8 by a rib bridge in the form of a rigid baton 23. The ends of the rigid baton 23 are attached to the ribs 15 on either side of the interruption 22 by a pair of inelastic bridge cords 24. The surface tension of the lateral surface 14 during pressurization maintains the bridge 23 in a horizontal orientation parallel to the ribs 15. When the surface tension is released, a universal joint then exists at the interruption 22 allowing the rib 15 to fold, thereby allowing the device to yield without damage when coming into contact with roadway camber (such as when crossing railway tracks) or other rigid structures during docking or tight manoeuvring. In a preferred embodiment as shown in FIG. 2, each trailer side 10 may have a pair of bags 8 connected end to end via an air duct 25 which allows pressure to equalize between them.

The invention claimed is:

1. An inflatable tube to be mounted onto the underside of a transport trailer such that when said tube is pressurized, air is directed along the lateral surface of said tube and away from the rear wheel assembly of said trailer when said trailer is in forward motion, wherein said tube is pressurized by ram air via an air scoop mounted to the lateral surface of said tube, the open end of said air scoop facing forwardly.

2. An inflatable tube as recited in claim 1, wherein a series of internal inelastic cords anchor the lateral surface of said tube to the underside of said trailer, and another series of internal inelastic cords anchor the medial surface of said tube to the underside of said trailer.

3. An inflatable tube as recited in claim 2, wherein said internal inelastic cords are interrupted along their lengths by their mutual attachment to a ring from which said internal inelastic cords extend radially.

4. An inflatable tube as recited in claim 1, wherein one or more horizontally oriented ribs are fixed along said lateral surface, such that upon pressurization of said tube, said lateral surface remains substantially planar.

5. An inflatable tube as recited in claim 4, wherein an interruption in said rib is bridged by a rigid baton, each end of said baton having attachment to said rib on either side of said interruption by a pair of flexible inelastic cords.

* * * * *